Patented May 17, 1949

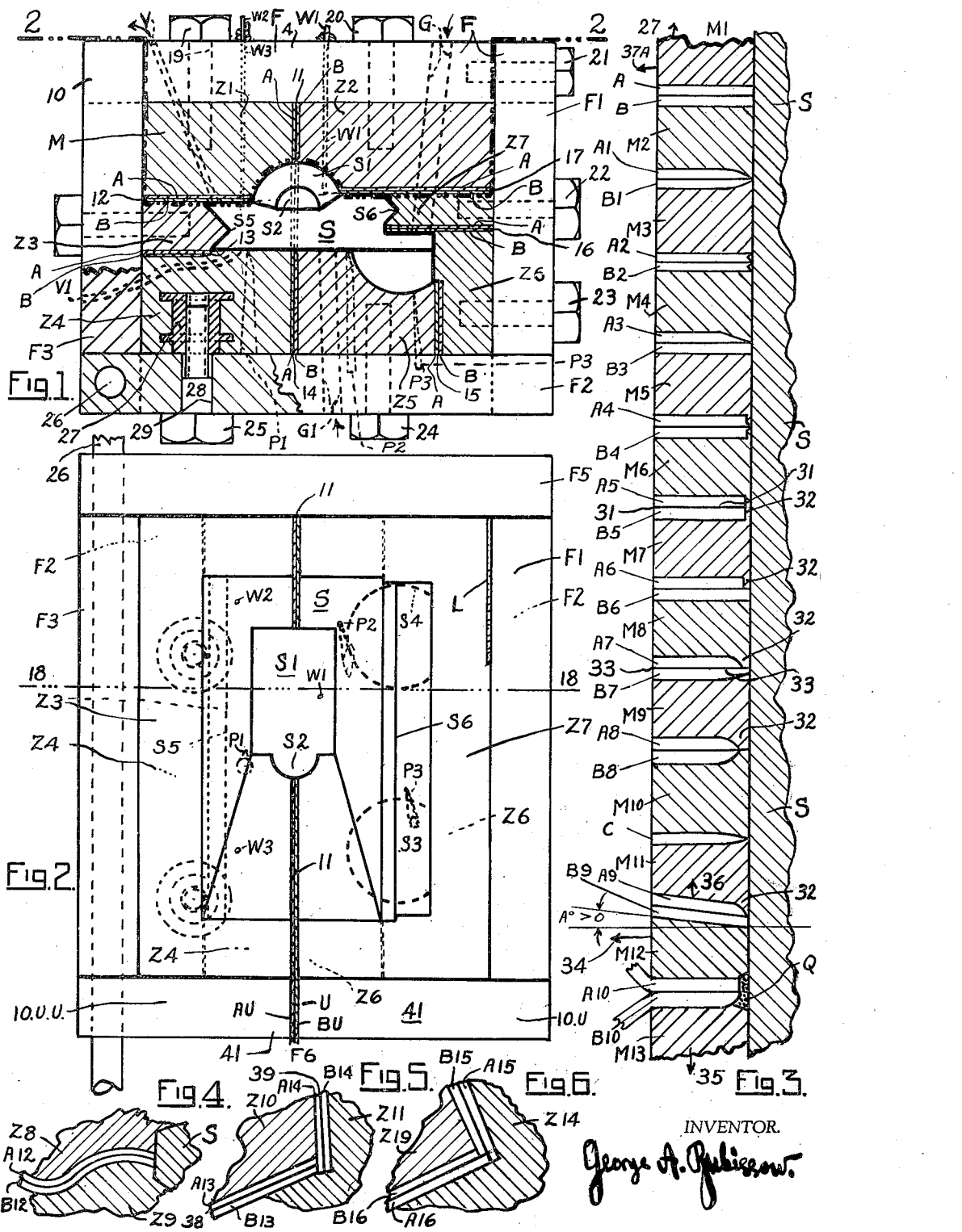

2,470,189

UNITED STATES PATENT OFFICE 2,470,189

METHOD FOR MANUFACTURING MOLDS

George A. Rubissow, New York, N. Y.

Application September 9, 1944, Serial No. 553,403

2 Claims. (Cl. 22—193)

This application is a continuation-in-part of U. S. patent application Serial #546,304, now abandoned, filed by George A. Rubissow.

This invention provides new method and means to manufacture compound molds composed of at least two parts which may be attached one to the other either by suitable attachment means or register or fit one into the other with or without the assistance of attaching means. Such molds may be used if desired, placed and supported in a mold casing provided therefor. For an intricate pattern to be reproduced, molds having intricate female cavities duplicating said pattern are extremely difficult to make and this invention offers means for the manufacture of such molds in the form of compound molds having not less than two mold parts or sections. This invention, in particular, is of great importance for making molds of steel or other iron-carbon alloys and/or of various alloys of thin lead zinc and the like easily fusible materials. The pattern or the objects to be reproduced in such molds may be any desirable machine part or jewelry or article, or any object made from suitable material.

This invention provides a new method, a means by which to carry out this new method, and products obtained by the use of this method and devices.

This invention is applicable for making molds of any kind from a given sample, or for making dies of any kind from a given pattern. In particular, this invention may be used for making a steel or metal mold from a given master pattern. Such mold, according to this invention, may be permanent, semi-permanent or non-permanent. The mold may be made of iron-carbon alloys (steels of any kind) while the pattern may be made of iron-carbon or refractory material or of any other suitable material for this purpose. The expression pattern will be used herein to connote master sample, or male form, or machine part, or article of any type, form and nature to be reproduced from a mold or die by casting, stamping out, etc.

The molds or dies according to this invention are composed of at least two parts or sections which, put together, form the mold. The mold may also be made of any suitable refractory component or components and the pattern may be made of metal or alloys or of any suitable chemical compound or substance for this purpose.

The molds or dies according to this invention may be also used for mass reproduction of wax-patterns or patterns made of any suitable substance such as used in the so-called "lost wax process," wherein the word "wax" may mean any substance of which the melting point is substantially below the melting point of the material of which the mold or the die is made.

The male pattern or the piece to be reproduced may be made of any metal or metal alloy, for instance, iron-carbon alloy, or of copper, iron, aluminum, or any suitable substance other than metallic—such as, for instance, refractories, resins, lava, etc.

The mold or die is placed in the casing in the manner prescribed by this invention, and supported therein and sectioned into at least two sections by means of special sectioning means. The mold or die casing is then filled with the mold or die-making material—for instance, with molten metal. The so-obtained molds or dies will be compound molds or dies having at least two parts or sections which fit together perfectly, registering one another in a strictly predetermined manner and/or forming a perfect interlocking or guiding system and which enables repeated use of the mold with great accuracy, etc.

Such mold or die, for instance, may be made by embedding a pattern made of metal (steel) in metal alloy such as zinc, lead, tin, or any mixture thereof (in any proportion and with or without other metals added thereto). The embedding of such a pattern in the molten metal or alloy, according to this invention, will produce a mold or die having at least two parts or sections, which, when removed from the mold or die may be used for mass production of a pattern such as wax pattern used in the lost wax process. Care must be taken in the dimensioning of the pattern and of the mold and dies to compensate for shrinkage of all of the elements—i. e. the material from which the mold or die is made; the material of the pattern (wax pattern, etc.); which will be cast therein; the material of which the mold will be made in which this "wax" pattern will be embedded; the material which will be cast in the latter mold after the "wax" pattern is removed therefrom. The total shrinkage K may be composed of K1 plus K2, plus K3, plus K4, etc.

In the case of a mold or die made of iron-carbon alloys, the master pattern may be made of suitable refractory material (very fine-grained and well-polished, if desired), and embedded in the molten iron-carbon alloy while supported and/or sectioned therein by special sectioning means according to this invention.

Thus, the most difficult and expensive iron-carbon dies and molds, even for the most intricate pattern-pieces may be made with the greatest of ease and economy with this invention. The more intricate the master pattern may be in shape and form, the more sections or mold-parts may the mold or die have accordingly to enable unlocking the mold or die to free the master pattern and thereafter free the pattern produced therein.

Like references throughout this specification will be used for the same or substantially the same meaning in reference to the drawings and the subject matter of this invention.

Fig. 1 is a diagrammatical cross sectional side view of one embodiment of this invention.

Fig. 2 is plan view of Fig. 1 along the plan passing through 2—2.

Fig. 3 is a diagrammatical side view in cross section with parts broken out of a mold with sectioning means used in accordance with this invention.

Figs. 4, 5, and 6 are diagrammatical side views in cross section with parts broken out of other sectioning means and molds in accordance with this invention.

On Figs. 1, 2, 3 and 4, S is the pattern, which is used as well for the manufacturing of the mold or die in Fig. 1 and 2 as for manufacturing of any desired number of duplications of it, by casting in the mold so obtained of such duplications directly, or by first producing in such a mold a plurality of "wax" or the like pattern and then using such "wax" or the like pattern in other molds of the character known as "lost wax process" mold.

On Figs. 1 and 2 the sample S may be of any form and shape, it may by way of example, comprise an intricate form of half cylinder S1, or half spheres S2, S3, and S4, of guides grooves S5 and S6 etc. The master pattern S may be suspended in the mold or in the die casing 10 by any suitable means, for instance may be suspended on one or more thin wires or the like, (W1, W2, W3, Figs. 1 and 2) or it may rest on three or more supports, in particular on three or more needle like supports P1, P2, and P3, Figs. 1 and 2, or both the wire suspension and the needle support suspension may be used, or the sample may rest on two knife-like members, the sharp edges of which contact the surface of the pattern, P1 and P3 on Fig. 1, may be considered as such knife like members viewed in cross section. The wires or the like may be affixed on the upper part of the casing or on their sides, in which latter case the pattern may rest on such wires in same manner as the body of a man resting in a hammock. The needle or the knife like supports may be placed resting on the bottom of the casing or they may be attached to it in guides or by fixation means, etc. Instead of needle and knife, or knife like members other type of supports may be used. When sharp pointed supports are used the advantage is obvious because the contact between the supports and the pattern is reduced to substantially a point contact of the very sharp top of such support. In case of a knife like member the contact is a line contact of little thickness, equal to the thickness of the very sharp edge of the knife. The use of the supports for the pattern is not essential when the sectioning means A, B or C may substitute the supports in their functioning during the manufacturing of the mold, i. e., during the filling of the mold casing 10 with the molten material, or with the self-setting pasty or powdered material.

One of the important aspects of this invention comprises the use of the sectioning means placed adjacent to the pattern or substantially adjacent thereto. The pattern S, Figs. 1 and 2, may be surrounded with sectioning means A and B which may be placed on the sectioning planes 11, 12, 13, 14, 15, 16 and 17, shown by way of example. Only one sectioning plane per same plane in which the pattern is sectioned may be used for simpler form samples, in which case the mold becomes a two-part mold, when two sectioning means are used the mold may become a two or three part mold, when three sectioning means are used the mold (or die) may become a three or four-part or four section mold. On Figs. 1 and 2 the number of sectioning planes in Fig. 1 is 11, 12, 13, 14, 15, 16, and 17 and in this plane of Fig. 1 there are sections or parts of the mold or die as follows: Z1, Z2, Z3, Z4, Z5, Z6 and Z7. On Fig. 2 there are sectioning planes 11—11 which are in this example the same as in Fig. 1. Thus the mold M of Figs. 1 and 2 according to the seven sectionings 11 to 17 may have seven sections or parts Z1 to Z7. However in case that in the plane of Fig. 2 still another sectioning means will be added by way of example perpendicular to the plane 11—11 and passing along the axis of the plane 18—18 then Z1 and Z2 and Z4 and Z5 will each be divided in two more parts by this sectioning means passing through plane 18—18. The sectioning means are shown as comprising two sheets, A and B, one adjacent to another. If desired only one such sectioning sheet may be used such as C or A or B on Figs. 1, 2, or 3. If desired more than two sheets per each sectioning means may be used, for instance two sheets with a thin sheet interposed in between them. This third sheet may be a solid sheet of same or another material than the two sheets A or B or it may be a layer of any suitable substance such as refractory paint, layer of powdered graphite, talcum, resin, oil, etc., or an electroplated layer of any suitable alloy or metal or a plurality of layers, enabling after the mold M has been cast in the mold casing 10, to ease or separate the mold parts one from another along the sectioning planes passing in between the sheets A and B. When one sheet A or B or C is used instead of two or more, the sheet A, or B, or C may be made from any suitable solid and may be covered on one or both of its sides with suitable layer of paint electroplated or otherwise applied thereon, to enable either to facilitate the separation of the mold parts which contact this layer, this at that place where such separation is desired, and/or to increase the adherence between the sectioning sheet A, B or C and that part of the mold with which such a sheet has to form one monolithic structure after the mold was cast.

It is obvious that when the two sheets sectioning means, A and B are used as shown on Figs. 1 and 2 and on Fig. 3 (except for C) then it is advantageous according to this invention to provide that surface of the sheets A and B which contact one another in the sectioning plane with a substance which may facilitate the removal of them one from another, such as for instance fine powdered graphite, talcum, or other suitable chemicals. On the other hand, the outer surfaces of same sheets A and B, i. e.: that surface which contacts the material from which the mold will be made (cast or otherwise made) should preferably be provided with adhesion increasing means including such means as rough surfacing, layers of suitable paints or electroplated layers of metal or alloys which may increase the bond or the soldering in between the corresponding parts of the mold and of such sectioning means forming such parts.

The thickness of the sectioning means is not necessarily limited to any predetermined thickness. According to this invention in many cases very thin foil may be used as sectioning means, for instance foils of thin iron carbon alloys, used for molds made from metals or alloys the melting point of which may be substantially equal or higher than the melting point of the material from which the mold is made. Thus if the foils A, B or C are for example made from thin steel, the mold may be made under certain circumstances also even from steel, in which case measures have to be taken that the molten steel when entering the casing 10 in which the sample S is placed with the sectioning means A, B or C also made from steel foils, will not fuse these foils together when the mold is solidified to the desirable degree of solidification, and such sheets may become soldered or welded to their respected mold parts.

When the foil is made from thin steel but the mold material is a material the melting point of which is substantially lower than the melting point of steel, then the casting of the molten material for forming the mold does not present any difficulty in respect to the danger that the foil may be molten or fused before the solidification will be reached up to the desired degree.

Particularly excellent results are obtained according to this invention by using thin steel or iron or copper or bronze foil as sectioning means while the material for the mold may be zinc, or lead or tin, or any appropriate mixture (alloy) of zinc, tin, lead or a mixture made from only two of them, or may be any other suitable alloy the characteristics of which may in respect to its melting point be suitable for this method of making molds while using sectioning foil made of metal or alloy having a higher melting point than the before mentioned one.

According to this invention various admixtures may be added to the material from which the mold or die is cast while using the sectioning means, in order to provide (1) a material which may have a smooth inner surface in the female form obtained after removing of the master pattern and in order to provide an easier removal of the pattern from the mold and of the pattern which may be cast therein once the mold is ready, and (2) for easier breaking or splitting or separation of the edge-part which may eventually be provided in between the edges of the sectioning means in case such means does not contact completely or adjacently the surfaces of the pattern while the mold is cast.

In case that the mold is made from iron carbon alloy, or from other suitable alloys or metal having very high or high melting points, the sectioning means according to this invention may be provided in form of thin or substantially thin sheets (plane or curved or undulated, etc.) made from mica, or any suitable refractory material, a blotting paper or cotton cloth or other suitable sheet-base or fibrous supporting material, the pores of which are well filled with powdered refractory material including among them such as powdered oxides or metals, (ammonium oxide, magnesium oxide, zincron oxide, etc.) or with powdered graphite, talcum, mica, with or without binder admixtures referred to hereinafter. Such sheets after they have been used as sectioning means during the casting of the mold M around the sample S may provide good results and in many cases may substitute for the metal or alloy sheets used for the same purpose.

The thickness of sectioning means in general may be from a fraction of one millimeter to several millimeters according to the purpose. When the sheetings are used as substitution for the supporting needles and/or knife-like members or wires, etc., they may be so closed that they will support the weight of the sample during the casting process. The needle and knife like members as well as the wire for support of the pattern S whenever it is necessary may be made if desired from refractory materials of any kind.

The sectioning means may be provided with guiding means, such channels, recesses, registering-locking means, grooves, etc. The sectioning means may be plane or curved or undulated, may be made from one single piece or from a plurality of overlapping one another or contacting or adjacent sheets or pieces of sheets.

One of the aspects of this invention provides the use of magnetized iron carbon sectioning means. The magnetization may be made permanent or temporary or by electromagnet. The pattern S may be also magnetic so that the sectioning means are attracted to it thus establishing a perfect contact in between the edges of such sheets and the surfaces of such pattern.

The casing 10 may be made from any material including refractory materials, with or without metal reinforcement or be made from metal or other materials and/or from appropriate combinations of them. On Figs. 1 and 2 the casing is shown diagrammatically only. The section parts Z1 to Z7 may be provided with guiding elements such as bolts or screws, etc., 19, 20, 21, 22, 23, 24, 25, 26. The bolt-screw 25 may be provided with a female-collar member 27 embedded in corresponding mold part Z4. The female collar may have a female thread to fit the male thread of the bolt-screw 25, and the latter may have a cylindrical section 28 which is guided in the cylindrical groove 29 provided in the casing 10.

The guiding means, 21 to 26, serve for a better control of the positions of the section parts of the mold whenever they should be dismounted or assembled together. The mold M may be provided with one or more pouring gates G and/or G1, etc., and with one or more airvents V, V1, etc. The gates and vents may be of any shape and form, and may constitute one solid with the pattern (mold form). The mold M or die M may be cast in the mold casing 10 by any suitable casting process, including also the (1) pressure casting, (2) static casting, (3) filling of the mold with powdered material which under the influence of pressure and/or heat until it becomes solidified into one monolithic mass, (4) centrifugal casting by means of rotating the casing around one axis of rotation exterior to the casing, (5) centrifugal casting by means of simultaneously rotating the casing around two axes of rotation each of said axes being exterior to said casing, and (7) a combination of centrifugal casting and pressure casting. In particular the use of U. S. Patent No. 2,222,666 is recommended, not limiting the process however thereto.

Another important aspect of this invention comprises the selection of the form of the sectioning means. The contact-edge of the sheets a—B or A, B or C may be among others according to this invention as shown on Fig. 3. A and B may be ordinary flat adjacent contact edges. A1 and B1 are tapering, thus the contact edge is reduced if desired to a thin line. A2, and B2 are grooved or tooth formed contact edges, which will leave an embossment or the like form of the groove on the pattern when the pattern will be reproduced. A3 and B3 is a combination contact edge of a flat B and sharpened A edges. A4 and B4 are similar to A1 and B1 but permit a different removing of the section parts M5 and M6 than the removal of M2 and M3 or M3 and M4. AX—BX and A1—B1, A2—B2, A3—B3, A4—B4 all have contact edges, i. e.: their edges do actually contact or substantially contact the surfaces of the pattern S. A5—B5 have flat edges similar to Ax—Bx but the edge does not contact the surface of the patterns, and a predetermined gap 30 is left in between them, which gap has to be split or broken in order to separate the parts M6 from M7, along the sectioning plane 31—31. A6—B6 is a combination of flat edge for B6 which contacts the pattern S and the flat edge for A6 which does not contact sample S and provides a gap 32. A7—B7 are sharpened edges one overlapping another. A8—B8 are sharp edges both not contacting the pattern S, thus the splitting or breaking of the mold-material along (or substantially along) the sectioning plane 33 is necessary to separate the parts M9 from M10. Such breaking if properly done, i. e., without deforming the mold, may be of great help to provide additionally a good edge, interlocking when the parts are assembled for use. C is a single sharpened sheet. A9—B9 and A10—B10 are shown forming an angle A° in between them. This will make easier the removal of the section M12 which thus becomes tapering.

M12 may be removed by sliding in the direction of the arrow 34, while the section M11 or M13 may be removed by sliding in the direction of arrows 35 and 36 and this is possible only when there are no other sectioning means preventing this to be done. The parts M1 may be removed by sliding in the direction of arrows 37 or 37A or in between them, and so on.

Another important aspect of this invention comprises the use of sectioning means A12—B12, Fig. 4, which may be curved or undulated in one or more places. The removal of the mold parts Z8 from Z9 should be made in the available direction. On Fig. 5 the sectioning means A13—B13 are contacting other sectioning means A14—B14 thus permitting an additional sectioning of the mold along the sectioning planes 38—39. Fig. 6 shows the two sectioning means A16—B16 and A15—B15 interlocking one another, and forming the mold parts Z13 and Z14. Whenever in this specification the drawings and/or the description refers to the use of sectioning means composed of two sheets A and B, they may be substituted by one single sheet which may have any desirable form of its edge, contacting the surface of the pattern S, or if desirable its outer edge may not at all contact the surface of the pattern S, in which case a gap will be formed in between this edge and the pattern, which gap has to be split or broken while the mold parts formed by such a sectioning means are removed one from another.

The method for making molds or dies according to this invention comprises as hereinbefore described placing the master pattern in the mold casing, preferably supporting this sample in said casing by suitable supporting means, providing sectioning means around at least one plane in respect to at least one part of said pattern, (at least one such sectioning means thus to be provided), filling thereafter the mold casing with the pattern and sectioning means therein—with molten material from which said mold has to be made, thereafter permitting the molten material to solidify until a predetermined degree of solidification is achieved, (thereafter preferably removing the mold from the casing when this is necessary) and thereafter dividing the mold into the sections or mold parts along the sectioning planes, i. e.: along the plane in which the sectioning means were provided, thus making the sample accessible for removal, thereafter removing this sample from said mold-part or parts, thereafter the mold-parts are ready for being reassembled whenever necessary for using it as a mold, in which a female pattern form is thus available. The pattern may have pouring gate or gates and airvent or vents.

The so obtained composite mold has at least two sections or parts, and it may be used for manufacturing pattern for "lost wax process" or as a die or mold for any other use.

Also, this method and devices were referred to as for use of molten materials or making the mold, it is obvious that the same method and devices may be used for making molds from powdered refractory material which may be introduced in the mold-casing with the pattern and sectioning means (and supporting means whenever necessary) therein, in a powdered state, or in a pasty state, ready for setting in the casing in a predetermined time, or in any other suitable form, which after a certain time, with or without application of heat and/or of pressure or under the influence of chemical reaction may set and form the monolithic body of the mold, which becomes sectioned into at least two parts along the plane or planes of the sectioning means herein referred to. Thus such molds may also be made from gypsum, plaster of Paris, investment material such as used for dentistry, or any other suitable material, including refractory material or cement, and its mixture with various refractory materials, including graphite, oxides or metals, talcum, this given by way of example only and not limiting thereto.

The sectioning planes 11 to 17, 31—31, and 33—33 were, for simplicity of design, shown one parallel to another or at right angles, not limiting the invention thereto, any relation in between them from 0° to 180° may be used in one or more plane.

This specification was not limited to any particular type or mold or die, in fact the molds or dies may be made according to this method and means for any type of machine part or any article whatever, either intricate or simple in its form and shape. In particular this invention enables the reproduction of any type of machine part, among others, gears, tools, pistons, crankshafts, cylinder heads, cylinders, parts for watches, parts for precision instruments, dental inlays, knives, surgical instruments, jewelry, parts for guns, machine gun parts, engine parts, turbine blades, turbine wheels, parts for electrical motors, locks, dies, etc.

On Figs. 1 and 2 the sheets A and B have been shown as contacting the pattern, this however does not limit this invention, and a gap of any nature may be provided in between the inner edges of this sheet and the respective part of the surface of the pattern S.

If desired the sectioning means may be bent outward, for instance as shown diagrammatically on Fig. 3 by A10—B10.

If desired the outer edges of the sectioning sheets may be placed outside the material from which the mold is made, and for this purpose these outer edges may be placed in corresponding slots provided in between the corresponding sections of a mold-casing 10, such as shown by way of example only, for sheet U on Fig. 2, where the two sheets AU and BU are passing through the casing wall 41, i. e.: the casing is thus either made from respective number of sections or is provided with a respective slot or groove in which said sectioning means AU and BU, or only one of them if a single sheet sectioning means is used, are placed. The sections IOU and IOUU may be interlocked one to another by suitable interlocking means. Such a section arrangement of a mold-casing has several advantages for dividing the mold into respective mold parts, by pulling one from another the respective sections of the casing. The inner walls of such sections of the casing may be if desired, adhesively attached to the material from which the mold parts are made, i. e.: they will form one monolithic structure with the mold. In case that the mold is not integral with the casing, separating sheets or layers may be interposed in between the walls of the casing and the outer surfaces of the mold, made from any suitable substance comprising among others, asbestos, rockwool, mica, graphite, refractory materials in sheet or in a form of layers of paint, etc.

Still another aspect of this invention comprises a combination of the mold made from metal or metal alloys while the inner edges of the sectioning means which contact or substantially contact, or contact through a gap, the respective part of the pattern, or provided with an edging belt made from a refractory material such as, among others, powdered fine grained graphite, talcum, oxides or metals, etc., or any appropriate mixture of them. Such materials may be applied on the inner edges of the sheets by means of sticking it in a pasty form to such edges, i. e.: by means of filling the gap in between said inner edges and said pattern with such filler, made from suitable refractories. This is shown by way of example only on Fig. 3 of A10—B10, where the gap Q is made from a refractory material, which when applied on may be in pasty state, and after the mold is made, it becomes solid and sufficiently brittle to provide a good breaking or splitting when the mold parts are divided one from another along the plane of the sectioning means A10—B10, or along only one of them if one is used. The pasty refractories used for this purpose may comprise a mixture of graphite in fine powdered form with some binding ingredients such as silica flour, molasses, sugar, linseed oil, suitable resins and oil, natural or synthetic, etc. Interesting results, according to this invention, are obtained by using a paste made from graphite mixed with powdered steel and a little talcum and bound together with linseed oil and sugar. As a binder for such pasty refractories, various natural fluids may be used, in particular serums and blood of animals or of living animals and fish, extracts from vegetables, from trees, from leaves of trees, from roots.

A very important aspect of this invention is to provide means for easy separation of the pattern from the mold, or of the pattern produced in the ready made mold from this mold. Special mold coatings may be used in particular all substances herein referred to for use as binder may be used when applied in thin layers on the surfaces of the sample which will become imbedded in the mold-making material (molten material or self setting material) or applied on the surface of the female form of the mold in case of making patterns by such means which have been previously described herein.

The above suggested coatings may be used also in any other casting methods and their use is not limited to this invention. Some of such coatings may comprise a mixture of animal blood with fine grained powdered graphite or talcum or both, with or without addition of other admixtures such as sugar, linseed oil, extract of quebracho, or extract from oak trees, etc. More detailed compositions of such coatings will be given in a divisional application and this specification gives only the basic new formula for such coatings.

Having now described and ascertained the main features of this invention and in which manner it may be carried out and used, what I claim is:

1. A casting method for manufacturing a compound mold from a molten metal by means of an empty mold casing, a pattern and sectioning sheets made from solid material, said compound mold being composed of at least two mold-parts and having inside of it a closed contour mold cavity which is a female impression of said pattern, said method comprising: (1) maintaining said pattern inside of said empty mold casing at a distance from the inner surfaces of said empty mold casing; (2) providing at least two pairs of adjacent, parallel one to another, and non-adherent one to another sectioning sheets, one edge of said sheets contacting said pattern on the surface thereof, the other edge of said sheets extending to the inner surface of said empty mold casing; (3) filling said empty mold casing with said molten metal thereby entirely embedding in said molten metal said pattern and said sectioning sheets; (4) causing said molten metal to solidify into an integral solid with said pattern and with said sectioning sheets; (5) separating the sheets of each pair of sectioning sheets thus dividing said integral solid into said mold parts; (6) removing said pattern from said mold parts thus providing said female impression of said pattern inside of mold parts, whereby when said mold parts are assembled together they form said compound mold.

2. A casting method for manufacturing a compound mold from a molten metal by means of an empty mold casing, a pattern and sectioning sheets made from solid material, said compound mold being composed of at least two mold-parts and having inside of it a closed contour mold cavity which is a female impression of said pattern, said method comprising: (1) maintaining said pattern inside of said empty mold casing at a distance from the inner surfaces of said empty mold casing; (2) providing at least two adjacent, parallel one to another, and non-adherent one to another sectioning sheets, one edge of said sheets contacting the surface of said pattern, the other edge of said sheets extending to the inner surface of said empty mold casing; (3) filling said empty mold casing with said molten metal thereby entirely embedding in said molten metal said pattern and said sectioning sheets; (4) causing said molten metal to solidify into an integral solid with said pattern and with said sectioning sheets; (5) separating the sheets of each pair of sectioning sheets thus dividing said integral solid into said mold parts; (6) removing said pattern from said mold parts thus providing said female impression of said pattern inside of mold parts, whereby when said mold parts are assembled together they form said compound mold.

GEORGE A. RUBISSOW.

REFERENCES CITED

The following references are of record in the file of this patent:

UNITED STATES PATENTS

| Number | Name | Date |
|---|---|---|
| 180,807 | Tank | Aug. 8, 1876 |
| 512,840 | Phelps | Jan. 16, 1894 |
| 1,244,257 | Sweetnam | Oct. 23, 1917 |
| 1,287,001 | Greenberg | Dec. 10, 1918 |
| 1,333,502 | McNeil | Mar. 9, 1920 |
| 1,341,670 | Powell | June 1, 1920 |
| 1,372,209 | Terranova | Mar. 21, 1921 |
| 1,680,502 | Craig | Aug. 14, 1928 |
| 1,614,315 | Pape | Jan. 11, 1927 |
| 1,644,358 | Copeman | Oct. 4, 1927 |
| 1,866,599 | Pettis | July 12, 1932 |
| 2,160,645 | Cooper | May 30, 1939 |
| 2,306,516 | Zalin | Dec. 29, 1942 |